United States Patent

[11] 3,621,300

[72] Inventor Lowell E. Clark
Phoenix, Ariz.
[21] Appl. No. 856,658
[22] Filed Sept. 10, 1969
[45] Patented Nov. 16, 1971
[73] Assignee Motorola, Inc.
Franklin Park, Ill.

[54] TRANSISTOR CIRCUIT HAVING THE PROPERTIES OF A UNIJUNCTION TRANSISTOR IN IMPROVED DEGREE
8 Claims, 5 Drawing Figs.

[52] U.S. Cl. .......... 307/283, 307/252 F, 307/288, 307/301, 307/313
[51] Int. Cl. .......... H03k 3/26
[50] Field of Search .......... 307/206, 252.25, 274, 283, 288, 299, 301, 305, 313

[56] References Cited

UNITED STATES PATENTS

| | | | |
|---|---|---|---|
| 2,963,692 | 12/1960 | Barter et al. .......... | 307/288 X |
| 3,292,005 | 12/1966 | Lee .......... | 307/288 X |
| 3,439,237 | 4/1969 | Sylvan .......... | 307/310 X |
| 3,504,197 | 3/1970 | Shibuya .......... | 307/305 X |
| 3,521,123 | 7/1970 | Armstrong et al. .......... | 307/252 X |

*Primary Examiner*—Stanley D. Miller, Jr.
*Attorney*—Mueller and Aichele

ABSTRACT: Known unijunction transistors having two bases and an emitter electrode provide a curve of emitter current vs. voltage of emitter to base one having joined negative and positive resistance branches, in which the peak-point currents and the on voltages are too high and in which the valley current at the junction of the positive and the negative branches of the curve is too low for certain applications of this circuit. A circuit has been provided which includes bipolar transistors and resistors or which includes a bipolar transistor and a four layer transistor, which can be put on a chip by known methods, that provides a wider and more controllable range for these parameters than is provided by known unijunction transistors or known bipolar transistor equivalents thereof.

Figure 1:
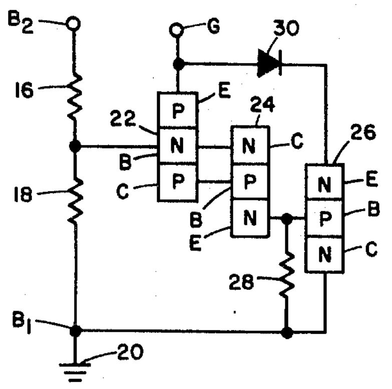

INVENTOR.
Lowell E. Clark
BY
Mueller, Aichele & Rauner
ATTY'S.

TRANSISTOR CIRCUIT HAVING THE PROPERTIES OF A UNIJUNCTION TRANSISTOR IN IMPROVED DEGREE

BACKGROUND

This invention relates to a bipolar transistor circuit which provides a desired characteristic curve.

When a steady voltage is applied between the bases of a known unijunction transistor and the emitter to the base one voltage of the unijunction transistor is increased, the leakage current flowing into the emitter electrode decreases from a negative value to zero and then increases to a first or peak-point. At this peak-point, the current increases and the voltage drops until a second point is reached, providing a negative-resistance branch from the peak-point to the second point. Then as the emitter current increases, the voltage also increases, providing a positive-resistance branch. The negative- and positive-resistance branches merge into each other gradually. The valley current which flows in the emitter circuit at the minimum voltage point of the two branches may not be much greater than the maximum leakage current and the slope of the positive-resistance branch as it recedes from the junction with the negative resistance branch may be undesirably low, whereby the resistance of the unijunction transistor in this part of its characteristic is undesirably high. Such a characteristic curve of emitter current plotted against voltage between the emitter and base one limits the circuit applications of unijunction transistors for providing negative resistance. Also at this state of the art, unijunction transistors present problems of manufacture, of linearity of characteristics and of resistance from base to base, whereby unijunction transistors with uniform characteristics are difficult to obtain and present problems in the use thereof for many purposes. Known circuits have been provided using bipolar transistors which avoid the manufacturing problems mentioned above, however the characteristics of these circuits while improved still are not optimum.

Summary

According to the invention, a circuit is provided including one transistor of one type and two transistors of the opposite type and including resistors, or including a four-layer transistor and a bipolar transistor and resistors, each of which can be manufactured as a chip, for providing a characteristic having a positive and a negative resistance branch, both of which are quite steep, and a valley current which is much higher than the peak-point leakage current of the circuit. Two of the transistors are connected to provide regeneration whereby the negative resistance portion of the branch is produced or, where used, the one four-layer transistor provides the negative resistance branch of the characteristic, and the additional transistor in each circuit modifies the negative resistance and the positive resistance branches of the characteristic whereby the valley current is much higher than in known circuits and the final resistance of the circuit is much lower than in known unijunction transistors.

DESCRIPTION

Figure 2:
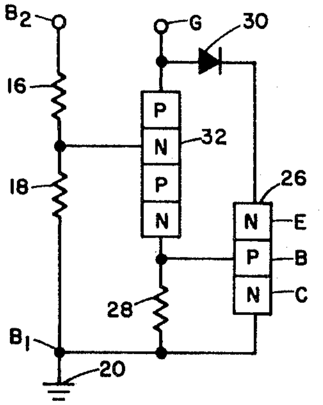
Figure 3:
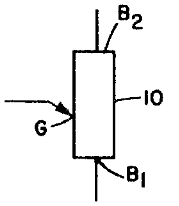
Figure 4:
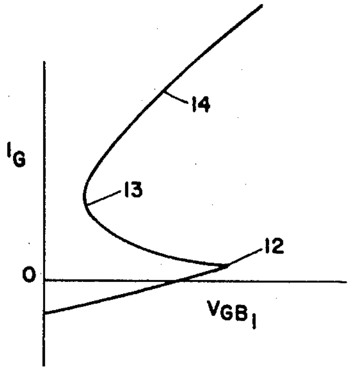
Figure 5:
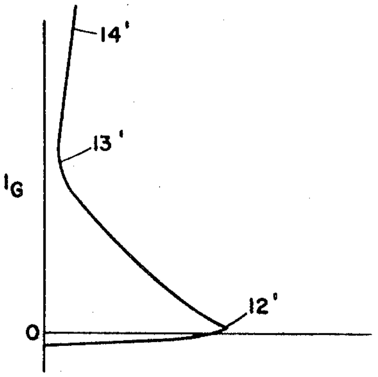

The invention will be better understood upon reading the following description in connection with the accompanying drawing in which FIGS. 1 and 2 show embodiments of this invention, FIG. 3 indicates a known unijunction transistor and FIGS. 4 and 5 are curves which are useful in explaining this invention.

Turning to FIG. 3, a known unijunction transistor 10 is illustrated, having bases $B_1$ and $B_2$ and an emitter G. With a steady voltage applied across the bases $B_1$ and $B_2$, and the voltage between the emitter G and the base $B_1$ increased gradually, the characteristic curve of current flowing into the emitter G plotted against the voltage between the emitter G and the base $B_2$, such as shown in FIG. 4, will be produced. That is, as the voltage $V_{GB_1}$ increases the current $I_G$ decreases to zero and then increases to the point 12. The current flowing in the emitter between the emitter 0 voltage value and the point 12 is leakage current. Then the current increases and the voltages decreases along the curve between the points 12 and 13. Then as the voltage is again increased, both the current and the voltage increases towards some point such as a point 14. It will be noted that the valley current at the point 13 may not be much greater than the maximum leakage current at the point 12 and that the branch 13 to 14 is not very steep, illustrating high positive resistance. An improved characteristic curve such as that shown in FIG. 5 is provided by the circuits of FIGS. 1 and 2. In FIGS. 1 and 2, the letters $B_{11}$, $B_2$ and G are used to indicate points in these circuits which are analogous to the similarly lettered points in FIG. 3.

In FIG. 1, two resistors 16 and 18 are connected between the terminals $B_2$ and $B_1$. A positive terminal of a voltage source (not shown) may be connected to the terminal $B_2$, and the negative terminal of the source and the terminal $B_1$ may be connected to a point of reference potential such as ground 20. The terminal G is connected to the emitter of a PNP-transistor 22. The base of the transistor 22 is connected to the junction of the resistors 16 and 18. The base and the collector of the transistor 22 are connected respectively to the collector and the base of an NPN-transistor 24. The emitter of the transistor 24 is connected to the base of an NPN-transistor 26 and to the terminal $B_1$, by way of a resistor 28. The emitter of the transistor 26 is connected to the cathode of a diode 30, the anode of the diode 30 being connected to the terminal G. The collector of the transistor 26 is connected to the terminal $B_1$.

Considering the operation of the circuit of G FIG. 1, it will be noted that the transistors 22 and 24 are connected in regeneration, the emitter of the transistor 22 acting as an input terminal and the collector of the transistor 24 acting as a feedback terminal. It will be noted that the current flowing out of the emitter of the transistor 24 flows either entirely through the resistance 28 or more or less into the base of the transistor 26, depending on the condition of conductivity thereof. While it is difficult to deposit a lateral PNP-transistor 22 having a high beta on a chip, still an NPN-transistor having a high beta can easily be deposited on a chip, whereby the products of the betas of the transistors 22 and 24 can easily be made greater than one, whereby the transistors 22 and 24 together provide a negative resistance effect. The purpose of the diode 30 is to prevent current flow in the described circuit if a negative voltage is applied to the terminal G. The resistor 28 is provided to control the gain vs. current characteristics of the transistor 26. Other known means such as inherent gain variation of the transistor 26 may be provided for this purpose instead of the resistor 28.

Assuming that a steady positive voltage is applied to the terminal $B_2$ with respect to the terminal $B_1$ in FIG. 1, then leakage current flows in the circuit connected to the terminal G. Let the voltage on the terminal G become more and more positive with respect to the terminal $B_1$. The leakage current decreases from its maximum at zero voltage on the terminal G to a positive near-zero value at the point 12', when the voltage on the emitter of the transistor 22 is about equal to the voltage at the junction of the resistors 16 and 18,. Then when the voltage on the terminal G is equal to the voltage at the junction of the resistors 16 and 18, emitter to base current flows in the transistor 22 and by regeneration, a negative-resistance branch of the curve of FIG. 5 such as the branch 12 and 13 of FIG. 4 would be traced. However, very soon, the voltage across the resistor 28 is sufficient to make the transistor 26 conductive and the transistor 26 draws more and more current from the terminal G through the diode 30, whereby the branch 12' to 13' of FIG. 5 is traced instead of the curve 12 to 13 of FIG. 4. It is noticed that the curve 12' to 13' is much steeper than the curve 12 to 13 and that the valley current of the curve of FIG. 5 is much greater than the valley current of FIG. 4. Furthermore, by this action of the transistor 26, the positive-resistance branch 13 to 14 of FIG. 4 is changed to the branch 13' to 14' of FIG. 5 that has relatively little positive resistance, that is the positive-resistance branch 13 to 14 of FIG. 4 is almost eliminated and the circuit of FIG. 1 exhibits an almost constant voltage drop above the valley current point of FIG. 5.

In FIGS. 1 and 2, similar elements have been given the same reference characters. Instead of the two transistors 22 and 24 of FIG. 1, one four-layer transistor 32 is used in FIG. 2. The control electrode of the transistor 32 which includes P-material is connected to the terminal G and the base which includes N-material and which is adjacent the control electrode is connected to the junction of the resistance 16 and 18, while the output electrode, which includes N-material is connected through the resistor 28 to the terminal $B_1$ and also to the base of the NPN-junction transistor 26. As is known, the one transistor 32 of FIG. 2 acts like the two regeneratively connected transistors 22 and 24 of FIG. 1, whereby the circuit of FIG. 2 operates like the circuit of FIG. 1. No explanation of the operation of the circuit of FIG. 2 need therefore be given.

As noted above, all the elements of FIGS. 1 and 2 are readily applied to a chip. Therefore, while the circuits of FIGS. 1 and 2 will ordinarily be provided in the form of chips, disclosure of how they are realized in chip-form will be evident from the circuit diagrams of FIGS. 1 and 2 and from the explanation thereof and no further explanation of said chips nor how they are made appears necessary.

What is claimed is:

1. A circuit having a negative-resistance characteristic between an input and a reference terminal thereof in response to a voltage between predetermined limits being applied between said input and said reference terminal comprising
   two resistive means connected in series between a voltage supply terminal and a reference terminal
   regenerative amplifying means having a gain greater than unity at all values of current therethrough greater than a leakage current and having a reference connection to a point between said resistive means, and an input connection to said input terminal and output terminal and
   an amplifying element having a control electrode connected to the output terminal of said regenerative means, an output terminal connected to said reference terminal and an input connection to said input terminal,
   whereby upon increasing the voltage on said input terminal to a voltage greater than the voltage between said two resistors, negative resistance appears between said input terminal and said reference terminal.

2. The invention of claim 1 in which said regenerative amplifying means comprises a PNP- and an NPN-transistor, the base of the PNP-transistor being connected to the junction of said resistors and to the collector of said NPN-transistor, the emitter of said PNP-transistor being connected to said input terminal, the collector of said PNP-transistor being connected to the base of said NPN transistor, the emitter of said NPN-transistor being connected to the control electrode of said amplifying element.

3. The invention of claim 1 in which said regenerative amplifier comprises a four-layer transistor having a first, a second, a third and a fourth layer, said input terminal being connected to said first layer, the junction of said resistors being connected to said second layer and said fourth layer being connected to the control electrode of said amplifying element.

4. The invention of claim 2 in which a resistor is connected from the emitter of said NPN-transistor to said reference terminal.

5. The invention of claim 3 in which a resistor is connected from said fourth layer to said reference terminal.

6. The invention of claim 1 in which said amplifying element is an NPN-transistor having an emitter connected to said input terminal by way of a rectifier.

7. A circuit comprising
   three transistors, the first and second of which are of one polarity-type and the third of which is of the opposite polarity-type, each of said transistors having two main electrodes and a base electrode
   a pair of resistors connected in series between a supply terminal and a reference terminal
   an input terminal connected to a main electrode of said third transistor and to a main electrode of said second transistor,
   a connection from a point between said resistors to the base electrode of said third transistor,
   a connection between the base electrode of said third transistor and a main electrode of said first transistor,
   a connection between the other main electrode of said third transistor and the base electrode of said first transistor,
   a connection between the other main electrode of said first transistor and the base electrode of said second transistor,
   a third resistor connected between the base electrode of said second transistor and said reference point and,
   a connection between the other main electrode of said second transistor and said reference point.

8. A circuit comprising,
   a first transistor having first, second and third and fourth layers,
   a second transistor having a base and main electrodes,
   a pair of resistors connected in series between a supply terminal and a reference terminal,
   a connection between an input terminal and said first layer,
   a connection between the junction of said resistors and said second layer,
   a connection from said fourth layer to the base electrode of said second transistor,
   a connection between said fourth layer and said reference terminal by way of a third resistor,
   a connection from said input terminal to one of said main electrodes and,
   a connection from said other main electrode to said reference terminal.

* * * * *